United States Patent
Ogawa (10) Patent No.: US 8,144,681 B2
(45) Date of Patent: Mar. 27, 2012

(54) WIRELESS COMMUNICATION METHOD AND APPARATUS

(75) Inventor: Yasushi Ogawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 283 days.

(21) Appl. No.: 12/516,544

(22) PCT Filed: Nov. 28, 2007

(86) PCT No.: PCT/JP2007/072947
§ 371 (c)(1),
(2), (4) Date: Feb. 16, 2010

(87) PCT Pub. No.: WO2008/066073
PCT Pub. Date: Jun. 5, 2008

(65) Prior Publication Data
US 2010/0150130 A1   Jun. 17, 2010

(30) Foreign Application Priority Data
Nov. 29, 2006   (JP) .................................. 2006-322472

(51) Int. Cl.
*H04B 7/212* (2006.01)

(52) U.S. Cl. ........ 370/347; 370/442; 370/503; 375/260; 375/347

(58) Field of Classification Search ......................... None
See application file for complete search history.

(56) References Cited

U.S. PATENT DOCUMENTS

| | | | | |
|---|---|---|---|---|
| 6,332,008 | B1* | 12/2001 | Giallorenzi et al. | 375/356 |
| 7,412,014 | B2* | 8/2008 | Nakao et al. | 375/347 |
| 2006/0128436 | A1* | 6/2006 | Doi et al. | 455/562.1 |
| 2006/0227889 | A1* | 10/2006 | Uchida et al. | 375/260 |
| 2006/0279459 | A1* | 12/2006 | Akiyama et al. | 342/372 |

FOREIGN PATENT DOCUMENTS

| | | |
|---|---|---|
| JP | 07-154383 | 6/1995 |
| JP | 09-084109 | 3/1997 |
| JP | 09-200295 | 7/1997 |
| JP | 2001-358638 | 12/2001 |

* cited by examiner

*Primary Examiner* — Chi Pham
*Assistant Examiner* — Mohammad Adhami
(74) *Attorney, Agent, or Firm* — DLA Piper LLP (US)

(57) ABSTRACT

In a wireless communication method in which a wireless communication apparatus having radio units 1 and 2 and central processing units 11 and 12 communicates wirelessly with a base station, the radio units 1 and 2 receive notification information by a notification channel, based on which reception timing the central processing units 11 and 12 calculate first and second transmission timing, based on which the wireless communication apparatus performs initial communication with the base station by a control channel, so that the first central processing unit 11 acquires information of communication time from the base station, based on which the first transmission timing is corrected and the information of communication time is transmitted to the central processing unit 12, based on which the central processing unit 12 corrects the second transmission timing, so that the wireless communication apparatus transmits information from the radio units 1 and 2 at these corrected timing respectively.

3 Claims, 5 Drawing Sheets

WIRELESS COMMUNICATION METHOD AND APPARATUS

CROSS REFERENCE TO RELATED APPLICATION

Present application is a national stage of international application No. PCT/JP2007/072947 filed Nov. 28, 2007. This application also claims priority to and benefit of Japanese Patent Application No. 2006-322472 filed on Nov. 29, 2006, the entire content of which is incorporated herein by reference.

TECHNICAL FIELD

The present invention relates to a wireless communication method and a wireless communication apparatus performing communication by a time division multiple access system.

BACKGROUND ART

Conventionally, a wireless communication terminal used for a communication system of a time division multiple access system (hereinafter arbitrarily abbreviated as TDD/TDMA system) includes one radio unit and communicates wirelessly with a base station. However, communication using one radio unit limits the communication speed. Therefore, it is considered recently to improve the communication speed by providing one wireless communication terminal with a plurality of radio units and thus increasing the number of slots used in the same frame.

As above, in order to communicate with one base station by providing one wireless communication terminal with a plurality of radio units, it is necessary that every radio unit is respectively synchronized with the base station. In this case, it is conceivable that each radio unit is regarded as an individual wireless communication terminal and the distance from the base station and delay time due to fading are measured through a control channel for each radio unit, so that each wireless terminal is independently synchronized with the base station as to frame transmission timing. It is noted that as a synchronization method for a wireless communication terminal having one radio unit is known one disclosed in Japanese Patent Application Laid-Open Publication No. 07-154383, for example.

However, when a plurality of radio units held by one wireless communication terminal use a control channel individually, the number of control channels for one terminal increases. Thus, it becomes impossible, with limited number of channels, to respond to this increase in the number of channels used, so that it is supposed that the number of terminals which can be held by the base station decreases. When the number of control channel resources used by one radio unit is 1, for example, the number of control channel resources used by a wireless communication terminal provided with N radio units is N. When communication of TDMA system is performed, the number of control channels per unit time is fixed. Therefore, when a wireless communication terminal provided with N radio units uses N times of control channel resources, the number of wireless communication terminals capable of frame synchronization with the base station decreases to 1/N.

DISCLOSURE OF THE INVENTION

Therefore, an object of the present invention is to provide a wireless communication method and a wireless communication apparatus of TDD/TDMA system, enabling a process of frame synchronization with a base station for a plurality of radio units without deteriorating use efficiency of the control channel to improve the communication speed.

The first aspect of the invention is to provide a wireless communication method for a wireless communication method for a wireless communication system provided with a first wireless communication apparatus having a first radio unit and a first central processing unit connected to the first radio unit, and a second radio unit and a second central processing unit connected to the second radio unit, a second wireless communication apparatus communicating wirelessly with the first wireless communication apparatus, comprising a notification information reception step in which the first radio unit and the second radio unit in the first wireless communication apparatus receive notification information transmitted by a notification channel from the second wireless communication apparatus;

a transmission timing calculation step in which the first central processing unit calculates first transmission timing based on reception timing of the notification information received by the first radio unit, and the second central processing unit calculates second transmission timing based on reception timing of the notification information received by the second radio unit;

an initial communication step in which the first wireless communication apparatus performs, by the first radio unit and based on the first transmission timing, initial communication with the second wireless communication apparatus by a control channel;

a communication-time information acquisition step in which the first central processing unit acquires information of communication time at the initial communication step from the second wireless communication apparatus;

a first correction step in which the first transmission timing is corrected based on acquired information of the communication time;

a transmission step in which the acquired information of the communication time is transmitted to the second central processing unit.

a second correction step in which the second central processing unit corrects the second transmission timing based on the information of the communication time acquired from the first central processing unit; and an information transmission step in which the first wireless communication apparatus transmits information from the first radio unit and the second radio unit at the corrected first transmission timing and second transmission timing respectively.

The second aspect of the invention is to provide the wireless communication method according to claim 1, comprising a step of frequency offset calculation in which a frequency offset is calculated respectively in the first central processing unit and the second central processing unit based on frequency of the notification channel by which the notification information has been received at the notification information reception step and a step of correcting frequency based on the calculated frequency offset value, wherein the information is transmitted based on the corrected frequency at the information transmission step.

The third aspect of the invention is to provide a wireless communication apparatus having a first radio unit and a first central processing unit connected to the first radio unit, and a second radio unit and a second central processing unit connected to the second radio unit, and communicating wirelessly with another wireless communication apparatus, wherein the first radio unit and the second radio unit comprise a notification information reception unit receiving notification information transmitted by a notification channel from the another wireless communication apparatus;

the first central processing unit and the second central processing unit are respectively provided with a transmission timing calculation timing unit calculating transmission timing based on reception timing of the notification information received by the first radio unit and the second radio unit;

the first radio unit further comprises an initial communication unit performing initial communication with the another wireless communication apparatus by a control channel based on the transmission timing calculated by the transmission timing calculation unit in the first central processing unit;

the first central processing unit further comprises a communication-time information acquisition unit acquiring information of communication time from the another wireless communication apparatus via the initial communication unit, a first correction unit correcting the transmission timing calculated by the transmission timing calculation unit in the first central processing unit based on acquired information of the communication time, a transmission unit transmitting the acquired information of the communication time to the second central processing unit;

the second central processing unit further comprises a second correction unit correcting the transmission timing calculated by the transmission timing calculation unit in the second central processing unit based on the information of the communication time acquired from the first central processing unit; and information is transmitted from the first radio unit and the second radio unit at the corrected first transmission timing and second transmission timing respectively.

DESCRIPTION OF EMBODIMENTS

Preferred embodiments of the present invention will now be described with reference to the accompanying drawings.

Figure 1:
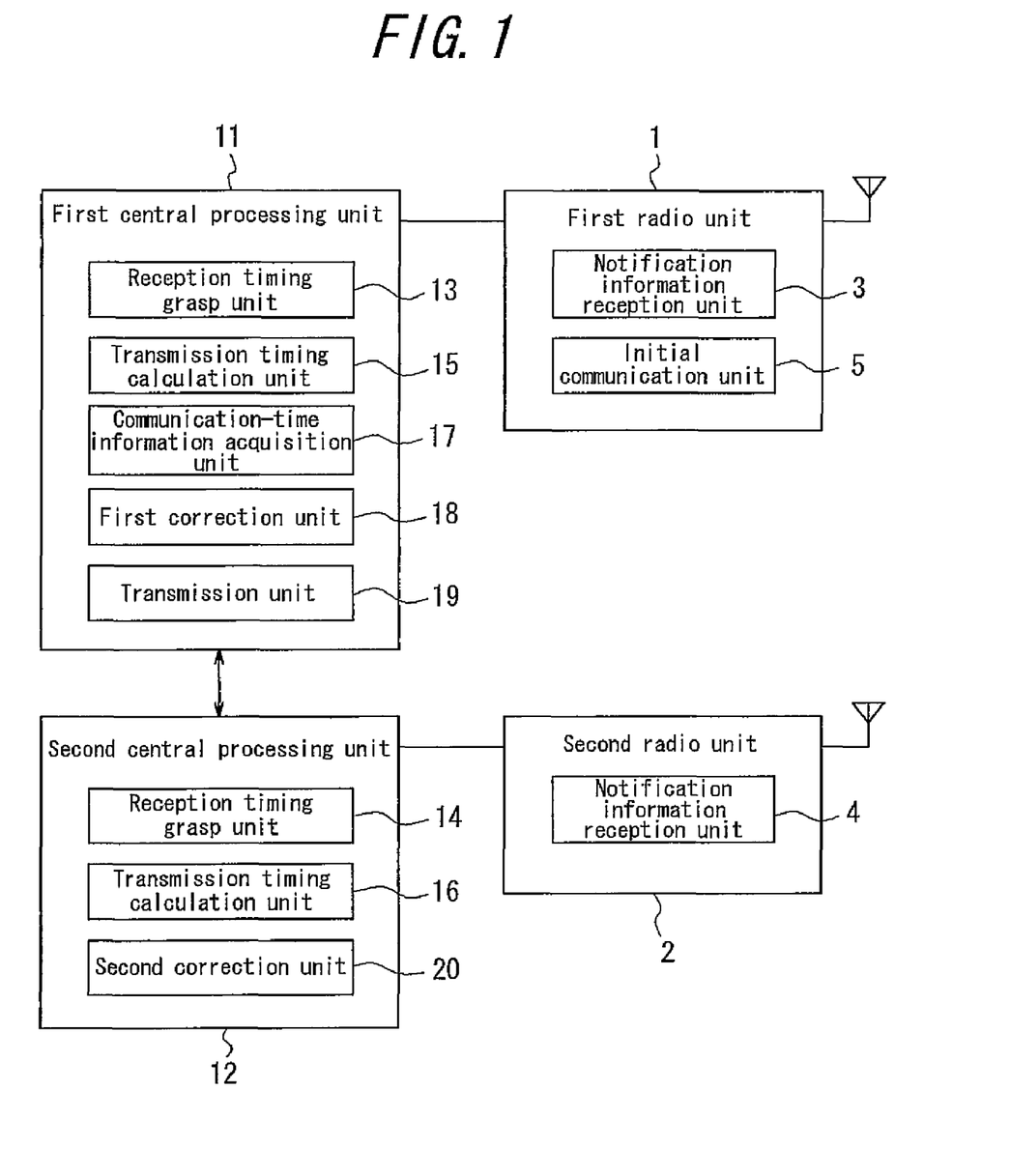
FIG. 1 is a functional block diagram illustrating configuration of a main part of a wireless communication terminal according to an embodiment of the present invention.

FIG. 1 is a block diagram illustrating configuration of a main part of a wireless communication terminal according to an embodiment of the present invention. A wireless communication terminal of the present embodiment forms a first wireless communication apparatus, and includes a plurality of radio units, with which there is performed wireless communication of TDD/TDMA system with another wireless communication apparatus such as a base station which is a second wireless communication apparatus. In FIG. 1, there will be described a wireless communication terminal having two radio units 1 and 2 available to a multicarrier for simplifying the drawing. The first radio unit 1 is controlled by a first central processing unit 11 and the second radio unit 2 is controlled by a second central processing unit 12. Furthermore, the first central processing unit 11 and the second central processing unit 12 respectively include a modulating/demodulating unit modulating a transmitting signal and demodulating a receiving signal, although it is not shown.

Two radio units 1 and 2 respectively include notification information reception units 3 and 4 which receive notification channel information from a base station and, further, the first radio unit 1 includes an initial communication unit 5 where initial communication with the base station is performed. On the other hand, the first and second central processing units 11 and 12 respectively include reception timing grasp units 13 and 14 grasping timing when the first and second radio units 1 and 2 receive notification information from a notification channel and transmission timing calculation units 15 and 16 calculating transmission timing based on the grasped timing of notification information reception. Furthermore, the first central processing unit 11 includes a communication-time information acquisition unit 17 acquiring information of communication time from a base station via the initial communication unit 5, a first correction unit 18 correcting transmission timing of the first radio unit 1 based on acquired information of communication time and a transmission unit 19 transmitting acquired information of communication time to the second central processing unit 12. Moreover, the second central processing unit 12 includes a second correction unit 2 correcting transmission timing of the second radio unit 2 based on information of communication time from the transmission unit 19. It is noted that each construction may be of hardware and of software.

Furthermore, two radio units 1 and 2 respectively include a VCTCXO (Voltage Controlled Temperature Compensated Crystal Oscillator) (not shown) independently, and the first central processing unit 11 and the second central processing unit 12 respectively include a counter determining the above reception timing and transmission timing. These two counters are synchronized with the VCTCXO in corresponding radio units 1 and 2 respectively, while one counter is not synchronized with the other.

In the present embodiment, the first central processing unit 11 is regarded as a master and the second central processing unit 12 is regarded as a slave. The combination thereof enables construction capable of combining and dividing transmitting/receiving data. It is noted that there may be provided another main central processing unit (not shown) between the first central processing unit 11 and the second central processing unit 12 in order to combine these. Here, a communication path formed using the first radio unit 1 and the first central processing unit 11 is arbitrarily referred to as a "main radio path" and a communication path formed using the second radio unit 2 and the second central processing unit 12 is arbitrarily referred to as a "sub radio path". In the present embodiment, the synchronization of the "main radio path" and the "sub radio path" which is conventionally independent is performed through one control channel. Moreover, a protocol used in communication of the present embodiment is one requiring a communication channel for data communication, a control channel for controlling synchronization or the like and a notification channel for notifying of broadcasts or the like.

Figure 2:
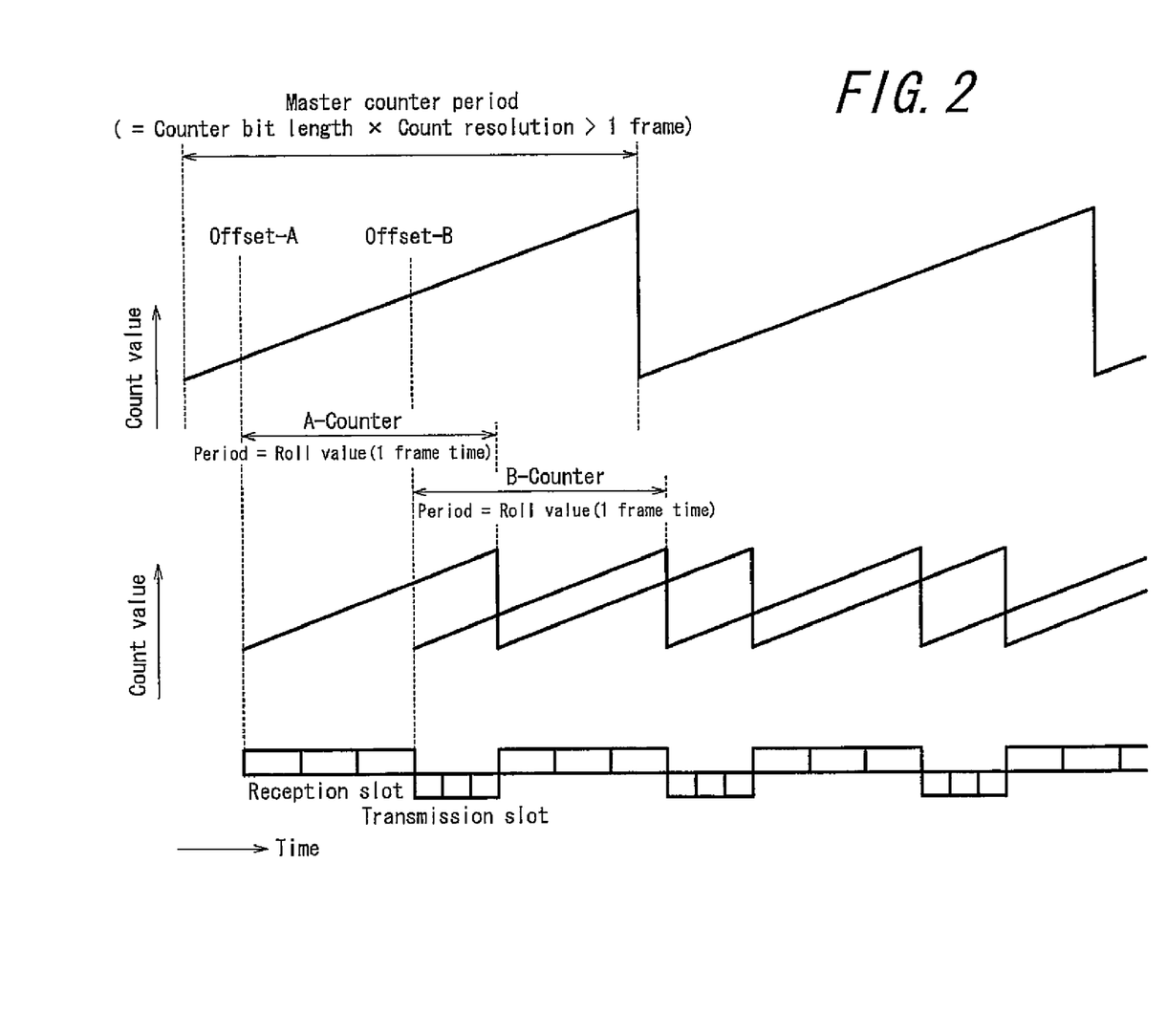
FIG. 2 is a graph illustrating a calculation of frame transmission timing by the transmission timing calculation unit in FIG. 1.

FIG. 2 illustrates a mechanism how the reception timing grasp units 13 and 14 in the first and second central processing units 11 and 12 calculate timing of frame transmission based on a counter offset value.

In FIG. 2, the lateral axis shows time and the longitudinal axis shows a count value of a counter. A master counter is a counter synchronized with a VCTCXO and the period is determined based on the count length and the count resolution. The master counter is controlled in the first and second central processing units 11 and 12 respectively and constantly performs count when the wireless communication terminal functions correctly. The value counted by the master counter is referred to as Master-count value. TA and TB respectively represent reception and transmission timing. TA and TB determine the phases of A-Counter and B-Counter as the following formula and the period of these counters are determined uniquely by a Roll value. These A-Counter and B-Counter are counters for counting count values apart from the master counter in the first and second central processing units 11 and 12 respectively. Moreover, the Roll value represents the length of a frame.

$A\text{-count value}=(\text{Master-count value}-TA) \bmod \text{Roll value}$ $B\text{-count value}=(\text{Master-count value}-TB) \bmod \text{Roll value}$ It is noted that the above A-count value and B-count value represent the count value counted by the A-Counter and the B-Counter respectively.

TA is the master counter value when the notification information reception units 3 and 4 in the first and second radio units 1 and 2 receive notification information from a base station through a notification channel. The time length of one frame is determined 5 msec or the like, for example, and the Roll value is 5 msec. As a result, the A-Counter performs a count process with TA as a standard time at the period (5 msec) specified by the Roll value. TB holds, as an initial value, a value added by the length of a reception slot when TA is confirmed. In the present embodiment, there is shown by a figure an example in the case that the number of slots n in a frame is 3.

Therefore, in the case that the counter offset value when the notification information reception unit 3 in the radio unit 1 receives notification information is $TA_1$ and the counter offset value when the notification information reception unit 4 in the radio unit 2 receives notification information is $TA_2$, the offset value $TB_1$ of standard transmission timing calculated by the transmission timing calculation unit 15 in the first central processing unit 11 and the offset value $TB_2$ of standard transmission timing calculated by the transmission timing calculation unit 16 in the second central processing unit 12 are as follows. It is noted that n represents the number of slots in a frame.

$TB_1=TA_1+$count amount corresponding to length of reception slot$\times n$ $TB_2=TA_2+$count amount corresponding to length of reception slot$\times n$ As to the reception timing grasp units 13 and 14 in the first and second central processing units 11 and 12, it is general that the reception timing grasp unit 13 positioned in the master side is activated and then the reception timing grasp unit 14 positioned in the slave side is activated. Furthermore, it is unclear from when two reception timing grasp units 13 and 14 start counting, which makes it difficult to accurately synchronize these two reception timing grasp units 13 and 14. Therefore, $TB_1$ and $TB_2$ which are transmission timings calculated by the transmission timing calculation units 15 and 16 show different offset values from each other. It is apparent that, as to these two offset values, each radio unit and central processing unit can synchronize with a base station by uniquely using a control channel. However, this deteriorates the use efficiency of the control channel as described above.

In the present embodiment, therefore, it is made possible that two radio units and a base station are synchronized with each other through one control channel when a wireless terminal is powered on, in the case of handoff or the like.

Figure 3:
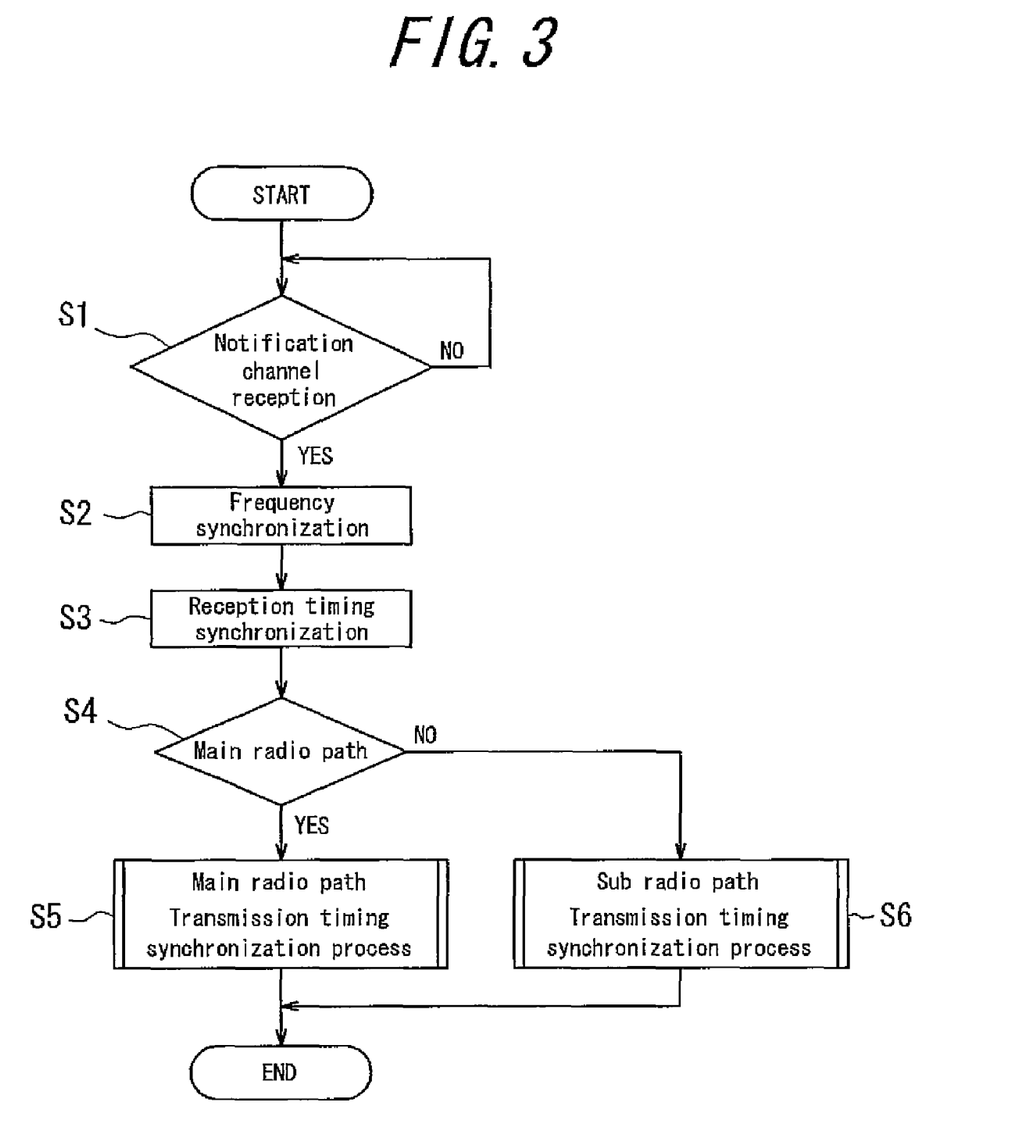
FIG. 3 is a flowchart illustrating a reception synchronization process by the wireless communication terminal shown in FIG. 1.

FIG. 3 is a flowchart illustrating a reception synchronization process by a wireless communication terminal according to the present embodiment.

First, the wireless communication terminal waits for notification information from a base station through a notification channel (Step S1). Next, when two notification information reception units 3 and 4 in the first and second radio units 1 and 2 independently receive notification information from the base station, the frequency synchronization is performed (Step S2). Here, the first and second central processing units 11 and 12 respectively calculate a frequency offset based on the detected frequency of notification channel, and corresponding VCTCXOs in the radio units 1 and 2 are adjusted.

Subsequently, the reception timing grasp units 13 and 14 acquire count values as offset values ($TA_1$ and $TA_2$) with notification information reception timing as a trigger. Based on these offset values, the transmission timing calculation units 15 and 16 calculate the offset value ($TB_1$ and $TB_2$) which is to be standard transmission timing for each by using the above formula. The first and second central processing units 11 and 12 respectively set offset value $TB_1$ and $TB_2$ as transmission timing (Step S3).

As to Step S4 or later, a transmission timing synchronization process of a main radio path and a transmission timing synchronization process of a sub radio path will be described separately.

Figure 4:
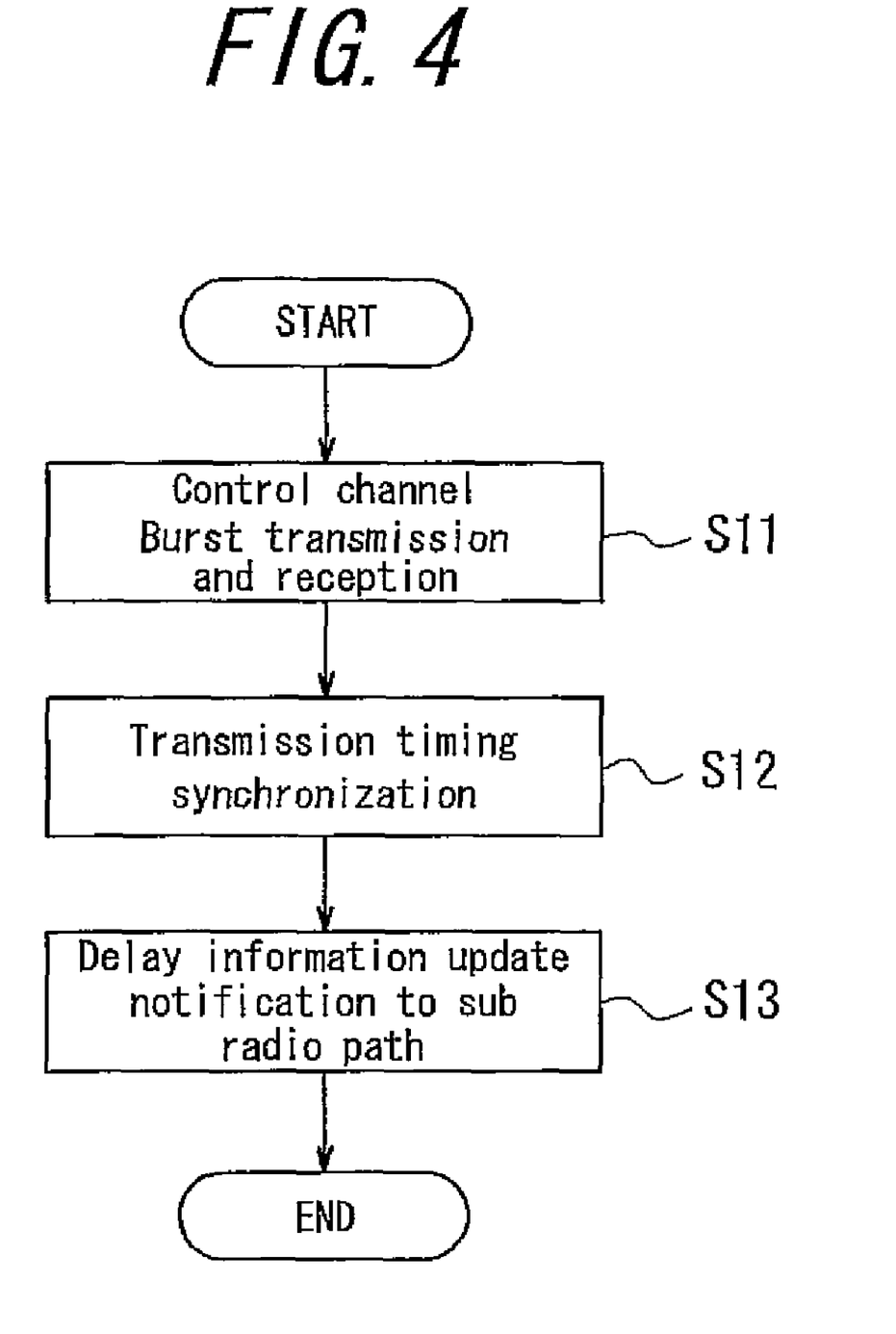
FIG. 4 is a flowchart illustrating a transmission timing synchronization process of the main radio path shown in FIG. 3.

FIG. 4 is a flowchart illustrating a transmission timing synchronization process of the main radio path at Step S5 in FIG. 3.

In the transmission timing synchronization process of the main radio path, as shown in FIG. 4, the initial communication unit 5 in the first radio unit 1 which is a master performs burst transmission toward a base station through a control channel according to the standard transmission timing $TB_1$ calculated previously and, as an answering signal to which, the communication-time information acquisition unit 17 in the first central processing unit 11 acquires delay time information from the base station through the control channel (Step S11).

Next, the first central processing unit 11 calculates, according to the following formula, a corrected offset value $TB_1'$ based on received delay time information. The first correction unit 18 updates the counter offset value based on this to synchronize transmission timing (Step S12). Here, $D_1$ represents delay time received by the communication-time information acquisition unit 17 in the first central processing unit 11.

$TB_1'=TB_1-D_1$

Thereafter, the transmission unit 19 in the first central processing unit 11 informs the second central processing unit 12 of delay information update notification including information of delay time acquired at Step S11 (Step S13). Thus, the main radio path can synchronize transmission timing of the first wireless portion 1 with a base station.

Figure 5:
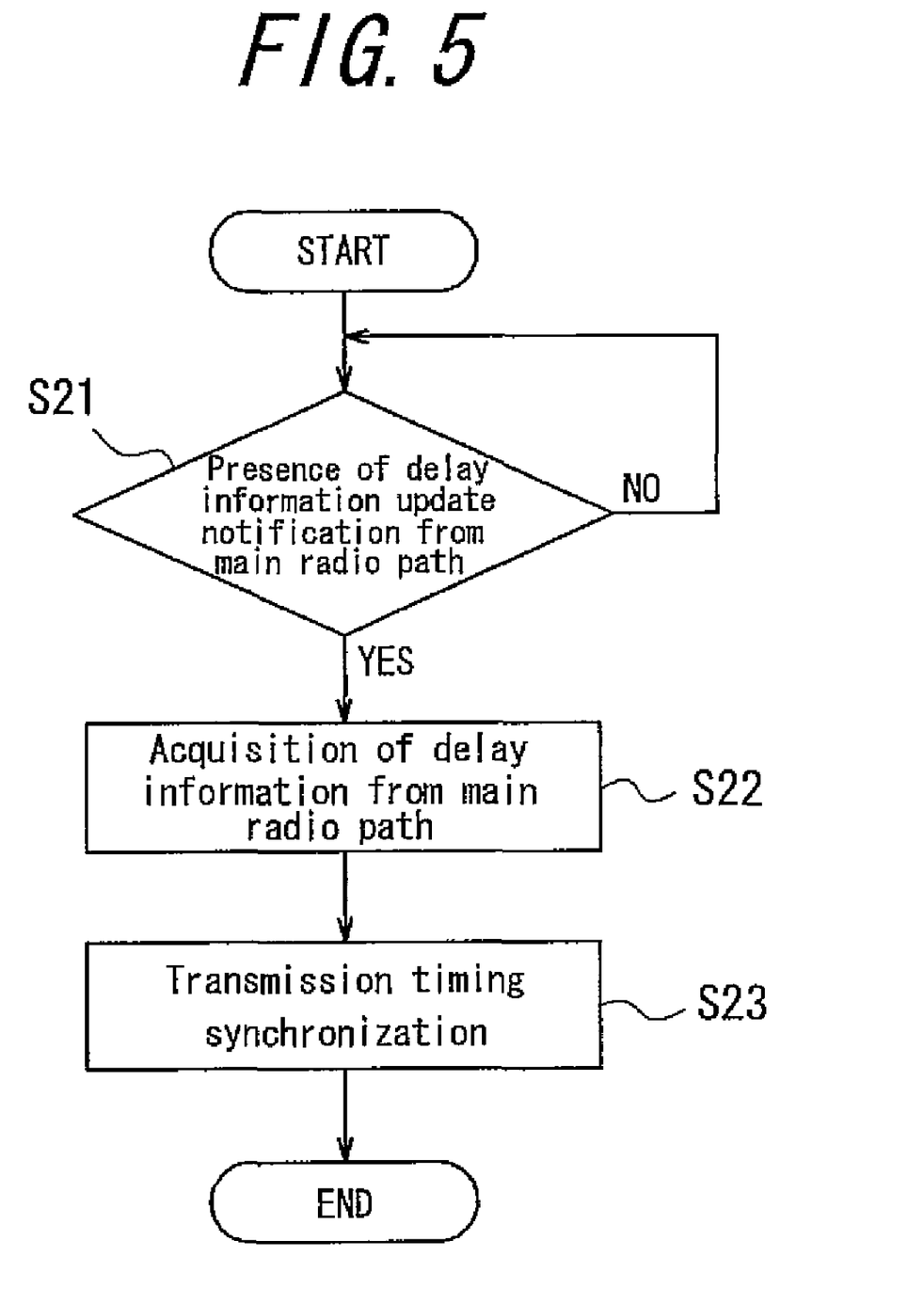
FIG. 5 is a flowchart illustrating a transmission timing synchronization process of the sub radio path shown in FIG. 3.

FIG. 5 is a flowchart illustrating a transmission timing synchronization process of the sub radio path at Step S6 in FIG. 3.

First in the transmission timing synchronization process of the sub radio path, as shown in FIG. 5, the second central processing unit 12 in the slave side waits for delay information update notification including information of delay time transmitted from the transmission unit 19 through the main radio path (Step S21). Then, when the delay information update notification is transmitted through the main radio path, the second central processing unit 12 acquires delay time information included in the notification (Step S22).

Subsequently, the second central processing unit 12 calculates, according to the following formula, a corrected offset value $TB_2'$ based on delay time information received from the transmission unit 19. The second correction unit 20 in the second central processing unit 12 updates the counter offset value based on the calculated offset value $TB_2'$ and synchronizes transmission timing (Step S23).

$$TB_2' = TB_2 - D_1$$

As to communication following this, the main radio path and the sub radio path control transmission/reception timing based on each offset value (TA, TB) for transmission and reception.

The present invention is not limited to the above embodiment, and many variations and modifications can be implemented. For example, two radio units are provided in the above embodiment, while the number of the radio units are not limited to two and may be equal to or greater than three. Moreover, the present invention can be widely applied to wireless communication methods and wireless communication apparatuses of TDD/TDMA system, and the number of time slots used is not limited to one shown in the above embodiment.

In addition, the communication path formed using the first radio unit 1 and the first central processing unit 11 is regarded as the main radio path in the above embodiment, while it is possible to preset which communication path including a radio unit and a central processing unit is regarded as a main radio path in a wireless communication apparatus having a plurality of radio units. Then, in the above embodiment, it is possible to configure the control unit of whole wireless communication apparatus to randomly select a radio unit and a central processing unit concerning a main radio path. In the above embodiment, moreover, by referring to information of error rate and the like in past communication records of a control channel, it is also possible to select a main radio path based on the information.

In the above embodiment, furthermore, the example in which the reception timing (TA) and the transmission timing (TB) are updated only by the notification channel and the control channel is described, while it is possible to update the reception timing (TA) every time of reception of communication channel. In the above embodiment, moreover, it is also possible to update the transmission timing (TB) by acquiring delay time information from a base station through other than the control channel.

INDUSTRIAL APPLICABILITY

The present invention made it possible that notification information is received at a plurality of radio units through a notification channel, while communication for receiving delay time information from a base station is performed at only one radio unit and, further, the radio unit informs other radio units of the information so that the other radio units can perform corrections. Therefore, the frame synchronization of all of the plurality of radio units can be achieved with the number of control channel resources used for one communication terminal without entailing the increase in number of control channels. Thus, it becomes possible to use channel resources held by a base station effectively.

The invention claimed is:

1. A wireless communication method for a wireless communication system provided with
   a first wireless communication apparatus having a first radio unit and a first central processing unit connected to the first radio unit, and a second radio unit and a second central processing unit connected to the second radio unit,
   a second wireless communication apparatus communicating wirelessly with the first wireless communication apparatus, comprising
   a notification information reception step in which the first radio unit and the second radio unit in the first wireless communication apparatus receive notification information transmitted by a notification channel from the second wireless communication apparatus;
   a transmission timing calculation step in which the first central processing unit calculates first transmission timing based on reception timing of the notification information received by the first radio unit, and the second central processing unit calculates second transmission timing based on reception timing of the notification information received by the second radio unit;
   an initial communication step in which the first wireless communication apparatus performs, by the first radio unit and based on the first transmission timing, initial communication with the second wireless communication apparatus by a control channel;
   a communication-time information acquisition step in which the first central processing unit acquires information of communication time at the initial communication step from the second wireless communication apparatus;
   a first correction step in which the first transmission timing is corrected based on acquired information of the communication time;
   a transmission step in which the acquired information of the communication time is transmitted to the second central processing unit.
   a second correction step in which the second central processing unit corrects the second transmission timing based on the information of the communication time acquired from the first central processing unit; and
   an information transmission step in which the first wireless communication apparatus transmits information from the first radio unit and the second radio unit at the corrected first transmission timing and second transmission timing respectively.

2. The wireless communication method according to claim 1, comprising
   a step of frequency offset calculation in which a frequency offset is calculated respectively in the first central processing unit and the second central processing unit based on frequency of the notification channel by which the notification information has been received at the notification information reception step and
   a step of correcting frequency based on the calculated frequency offset value, wherein the information is transmitted based on the corrected frequency at the information transmission step.

3. A wireless communication apparatus having a first radio unit and a first central processing unit connected to the first radio unit, and a second radio unit and a second central processing unit connected to the second radio unit, and communicating wirelessly with another wireless communication apparatus, wherein the first radio unit and the second radio unit comprise
- a notification information reception unit receiving notification information transmitted by a notification channel from the another wireless communication apparatus;

the first central processing unit and the second central processing unit are respectively provided with
- a transmission timing calculation timing unit calculating transmission timing based on reception timing of the notification information received by the first radio unit and the second radio unit;

the first radio unit further comprises
- an initial communication unit performing initial communication with the another wireless communication apparatus by a control channel based on the transmission timing calculated by the transmission timing calculation unit in the first central processing unit;

the first central processing unit further comprises
- a communication-time information acquisition unit acquiring information of communication time from the another wireless communication apparatus via the initial communication unit,
- a first correction unit correcting the transmission timing calculated by the transmission timing calculation unit in the first central processing unit based on acquired information of the communication time,
- a transmission unit transmitting the acquired information of the communication time to the second central processing unit;

the second central processing unit further comprises
- a second correction unit correcting the transmission timing calculated by the transmission timing calculation unit in the second central processing unit based on the information of the communication time acquired from the first central processing unit; and information is transmitted from the first radio unit and the second radio unit at the corrected first transmission timing and second transmission timing respectively.

* * * * *